A. CANE.
RESILIENT WHEEL.
APPLICATION FILED AUG. 6, 1913.

1,112,116.

Patented Sept. 29, 1914.

WITNESSES:
Charles Pickles.
Thos Lashberg

INVENTOR
Alfred Cane,
BY G.H. Strong.
ATTORNEY

UNITED STATES PATENT OFFICE.

ALFRED CANE, OF OAKLAND, CALIFORNIA.

RESILIENT WHEEL.

1,112,116. Specification of Letters Patent. Patented Sept. 29, 1914.

Application filed August 6, 1913. Serial No. 783,263.

*To all whom it may concern:*

Be it known that I, ALFRED CANE, a citizen of the United States, residing at Oakland, in the county of Alameda and State of California, have invented new and useful Improvements in Resilient Wheels, of which the following is a specification.

This invention relates to a resilient wheel.

The purpose of the invention is to provide a simple, durable, cheaply-manufactured, easily-attached resilient tire.

The object of the invention is to construct a resilient, puncture-proof tire which is built up of alternate layers of spring steel and wood, and which is so constructed that it may be applied to the felly of any standard wheel now in use.

Further objects will appear hereinafter.

The invention consists of the parts and the construction and combination of parts as hereinafter more fully described and claimed, having reference to the accompanying drawings, in which—

Figure 1:
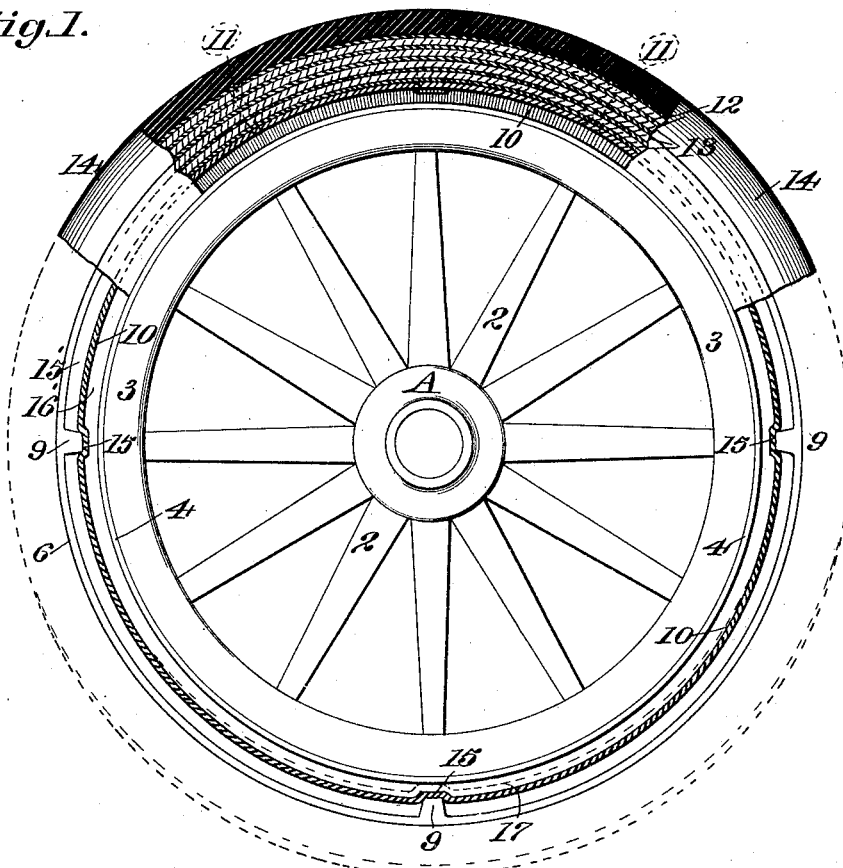
Figure 2:
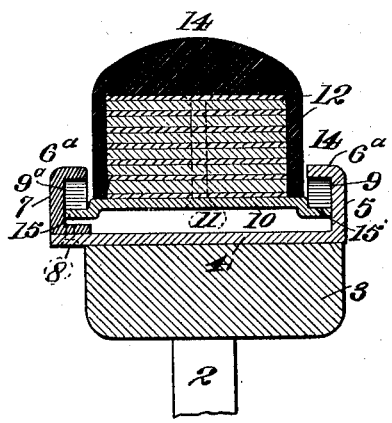

Figure 1 is a side elevation of the wheel and tire partly broken away. Fig. 2 is a cross-section of the felly, showing the tire in position.

Referring to the drawings: A indicates the hub, 2 the spokes, and 3 the felly of a standard wheel. Suitably secured to the felly is a metal ring 4, provided with an annular flange 5, upon the outer edge of which is formed an inwardly extending flange 6. The other side of the ring is open, as indicated in Fig. 2, for the purpose of permitting the application of a removable ring 7, which may be secured to the main ring 4 by any suitable means, or as here shown by screws 8. The removable ring 7 is also provided with an inwardly-turned flange 6ª, and both flanges 6 and 6ª are provided with a plurality of supporting lugs 9 and 9ª.

Interposed between the flanges 5 and 7 is a flexible steel ring 10, which has sufficient diameter and width to be supported by the lugs 9 and 9ª.

Surrounding the ring 10, and suitably secured to same by bolts 11, or similar means, is a built-up tire which consists of alternate annular layers of spring steel and wood. These alternate layers of spring steel 12 and wood 13 are preferably applied as a continuous strip which is wound about the ring 10.

The sides and outer face of the built-up tire are preferably covered with rubber, as indicated at 14, (which may be secured in any suitable manner) to provide a durable running tread and also to prevent the admission of grit and moisture between the alternate layers of the tire.

For the purpose of locking the flexible tire against circumferential movement with relation to the wheel proper, suitable recesses 15 have been formed in the main tire ring 10 into which the supporting lugs project; and circumferential movement is thus prevented.

A tire constructed of alternate layers or rings of wood and spring steel produces a highly flexible, durable, puncture-proof structure. The wheel proper is entirely supported upon the inner ring 10 of the tire by the lugs 9 and 9ª, and sufficient space has been provided between the outer retaining flanges 6 and 6ª and the ring 4, as indicated at 15' and 16', to permit the tire to contract or expand, as indicated by dotted lines at 17, when encountering the usual road obstructions. The wheel supported within the flexible tire ring will thus be free and easy riding, as all road shocks are entirely absorbed by the tire ring.

The materials and finish of the several parts of the wheel are such as experience and judgment of the manufacturer may dictate.

Having thus described my invention, what I claim and desire to secure by Letters Patent, is:

In a resilient wheel, peripheral flanges secured to the wheel felly and extending outwardly therefrom and having the outer edges thereof turned inwardly, a series of lugs disposed radially of the wheel and being secured to the inner circumference of each of said inturned portions of the flanges and extending inwardly toward the felly, the free ends of said lugs being spaced from the felly, an elastic metallic ring surrounding said felly in spaced relation thereto, said ring having a series of depressed parts located on each side thereof which form sockets into which the free ends of the respective lugs project so as to prevent relative circumferential movement between the ring and felly, and an annular tire secured to the ring.

In testimony whereof I have hereunto set my hand in the presence of two subscribing witnesses.

ALFRED CANE.

Witnesses:
 JOHN H. HERRING,
 W. W. HEALEY.